US010764281B1

(12) United States Patent
Gaeta et al.

(10) Patent No.: US 10,764,281 B1
(45) Date of Patent: Sep. 1, 2020

(54) SYSTEMS AND METHODS FOR AUTHENTICATING A USER USING AN IMAGE CAPTURE DEVICE

(71) Applicant: United Services Automobile Association (USAA), San Antonio, TX (US)

(72) Inventors: Michael Joseph Gaeta, San Antonio, TX (US); Sumita T. Jonak, San Antonio, TX (US); Gabriel Carlos Fernandez, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 201 days.

(21) Appl. No.: 15/864,940

(22) Filed: Jan. 8, 2018

Related U.S. Application Data

(60) Provisional application No. 62/444,173, filed on Jan. 9, 2017.

(51) Int. Cl.
*H04L 29/06* (2006.01)
*G06K 9/00* (2006.01)
*G06F 21/32* (2013.01)

(52) U.S. Cl.
CPC ......... *H04L 63/0861* (2013.01); *G06F 21/32* (2013.01); *G06K 9/00892* (2013.01); *H04L 63/102* (2013.01)

(58) Field of Classification Search
CPC ........ G06F 21/32; G06F 21/31; G06F 21/316; G06F 3/017; H04L 63/0861; H04L 63/08; H04L 63/10; H04L 63/815; H04L 63/082; H04L 9/3231
See application file for complete search history.

(56) References Cited

U.S. PATENT DOCUMENTS 10,078,744 B2 * 9/2018 Cash .................... G06Q 20/341
10,397,208 B2 * 8/2019 Eramian ................. H04L 63/08
(Continued)

OTHER PUBLICATIONS

Du, Shichuan, et al.; "Compound facial expressions of emotion"; Proceedings of the National Academy of Sciences; Mar. 31, 2014; E1454-E1462; http://www.pnas.org/cgi/doi/10.1073/pnas.1322355111 (last accessed Jan. 8, 2018).

*Primary Examiner* — Sher A Khan
(74) *Attorney, Agent, or Firm* — Fletcher Yoder, P.C.

(57) ABSTRACT

A user authentication system includes an image capture device and a controller communicatively coupled to the image capture device. The controller receives first image data associated with user identification information and generates a first set of biometric data based on the first image data. The controller also receives second image data associated with a first user action in response to the first set of biometric data approximately matching a first set of authenticated biometric data. The controller further generates a second set of biometric data based on the second image data and receives third image data associated with a second user action. The controller also generates a third set of biometric data based on the third image data. The controller further grant access to a user account in response to the second and third sets of biometric data approximately matching second and third sets of authenticated biometric data, respectively.

16 Claims, 4 Drawing Sheets

(56) References Cited

U.S. PATENT DOCUMENTS

| | | | | |
|---|---|---|---|---|
| 2001/0036297 | A1* | 11/2001 | Ikegami | G06F 21/32 |
| | | | | 382/115 |
| 2004/0133582 | A1* | 7/2004 | Howard | G06K 9/00006 |
| 2005/0210417 | A1* | 9/2005 | Marvit | G06F 3/017 |
| | | | | 715/863 |
| 2010/0231945 | A1* | 9/2010 | Tanaka | H04N 1/00408 |
| | | | | 358/1.13 |
| 2012/0019379 | A1* | 1/2012 | Ben Ayed | G08B 13/1436 |
| | | | | 340/539.1 |
| 2014/0064574 | A1* | 3/2014 | Hanna | G06K 9/2027 |
| | | | | 382/116 |
| 2014/0282964 | A1* | 9/2014 | Stubblefield | H04L 63/0853 |
| | | | | 726/7 |
| 2015/0379253 | A1* | 12/2015 | Cook | G06F 21/32 |
| | | | | 726/19 |
| 2016/0071111 | A1 | 3/2016 | Wang et al. | |
| 2016/0175646 | A1* | 6/2016 | Jacobson | A61B 5/1121 |
| | | | | 434/247 |
| 2016/0219057 | A1* | 7/2016 | Das | H04L 63/101 |
| 2017/0032114 | A1* | 2/2017 | Turgeman | H04W 12/06 |
| 2017/0053108 | A1* | 2/2017 | Jakobsson | H04L 63/0861 |
| 2017/0147862 | A1* | 5/2017 | Kim | H04L 63/0861 |
| 2017/0324736 | A1* | 11/2017 | Connell, II | H04L 63/0861 |
| 2018/0300555 | A1* | 10/2018 | Hodge | G08B 13/19663 |

\* cited by examiner

SYSTEMS AND METHODS FOR AUTHENTICATING A USER USING AN IMAGE CAPTURE DEVICE

CROSS REFERENCE TO RELATED APPLICATIONS

This application claims priority from and benefit of U.S. Provisional Application Ser. No. 62/444,173, filed Jan. 9, 2017, entitled "Systems and Methods for Authenticating a User Using an Image Capture Device," which is hereby incorporated by reference in its entirety for all purposes.

BACKGROUND

The present disclosure relates generally to authenticating a user, and more particularly to systems and methods for authenticating the user using an image capture device.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

A user authentication system may authenticate users attempting to access account information (e.g., of a financial account, an insurance account, a social media account, an electronic device profile, and the like). The user authentication system determines whether a user is who they declare to be. The user authentication system may compare credentials provided by the user to those stored in a database of authorized users' information. In human-to-computer interactions, the user typically enters or chooses a username and enters a password or personal identification number via an input device, such as a keyboard, touchscreen, card reader, and the like. However, user names and passwords may be guessed, stolen, or accidentally revealed. For example, user names are frequently a combination of a user's first initial and last name. As another example, users often base passwords on date formats or phone numbers, making them easier to determine.

Some user authentication systems include biometric verification. For example, such user authentication systems may use facial recognition, retinal scanning, fingerprint analysis, and the like, to authenticate the identity of a user. Some user authentication systems may include recognizing natural movements or thermal capture of the user to determine that the user is a live person, and not a still image or video capture used to falsify the identity of the user.

However, collecting such biometric information or evidence of a live person may use additional hardware beyond an image capture device, and thus be expensive to implement.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates generally to authenticating a user, and more particularly to systems and methods for authenticating the user using an image capture device. Such systems and methods may include authenticating the user matching a sequence of gestures, expressions, and the like, set up at a previous time by the user. Advantageously, the disclosed systems and methods may be implemented using less hardware than comparable systems that use biometric verification.

Figure 1:
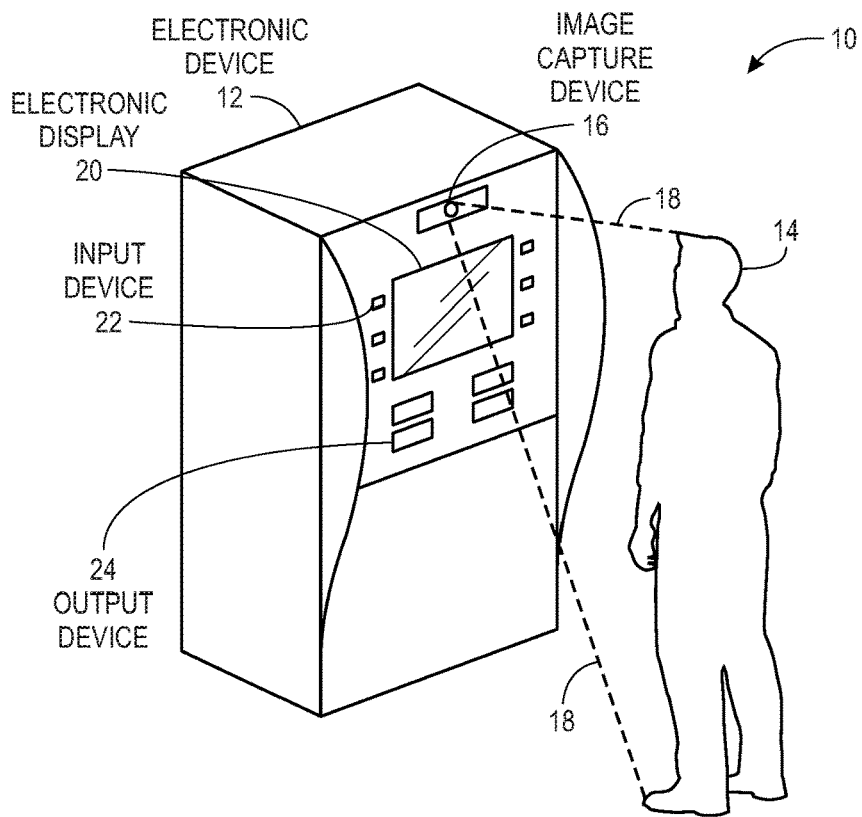
FIG. 1 is a user authentication system that includes an example electronic device that may authenticate a user, in accordance with an embodiment of the present disclosure.

With the foregoing in mind, FIG. 1 is a user authentication system 10 that includes an example electronic device 12 that may authenticate a user 14, in accordance with an embodiment of the present disclosure. The electronic device 12, such as an automatic teller machine, a passport verification machine, and the like, may provide a product or service to the user 14. The electronic device 12 includes an image or video capture device 16 that captures images or videos of the user 14. In some embodiments, the images may be frames that collectively form a video of the user 14. The image capture device 16 may have any suitable viewing angle or range 18, such that a face, portion of a body, or entire body of the user 14 may be captured.

The electronic device 12 may include an electronic display 20 that outputs information to the user 14. The information may include instructions (e.g., authentication instructions) to the user 14 and/or information (e.g., account information of the user 14) requested by the user 14. In some embodiments, the electronic display 20 may include touch functionality (e.g., in the form of a touch screen). As such, the user 14 may use the electronic display 20 to input information (e.g., changes to an account of the user 14, authentication information, and the like).

The electronic device 12 may also include one or more input devices 22, such as buttons, dials, a keyboard, a mousing device, a trackpad, a microphone, a retinal scanner, a fingerprint reader, a card reader, and the like. The input devices 22 may be used to enter authentication information, account information, changes to account information, and the like. The electronic device 12 may also include one or more output devices 24, such as additional electronic displays 20 to provide information to the user 14 or dispensers to provide goods or other physical objects (e.g., for cash, tickets, receipts, and the like) to the user 14.

Figure 2:
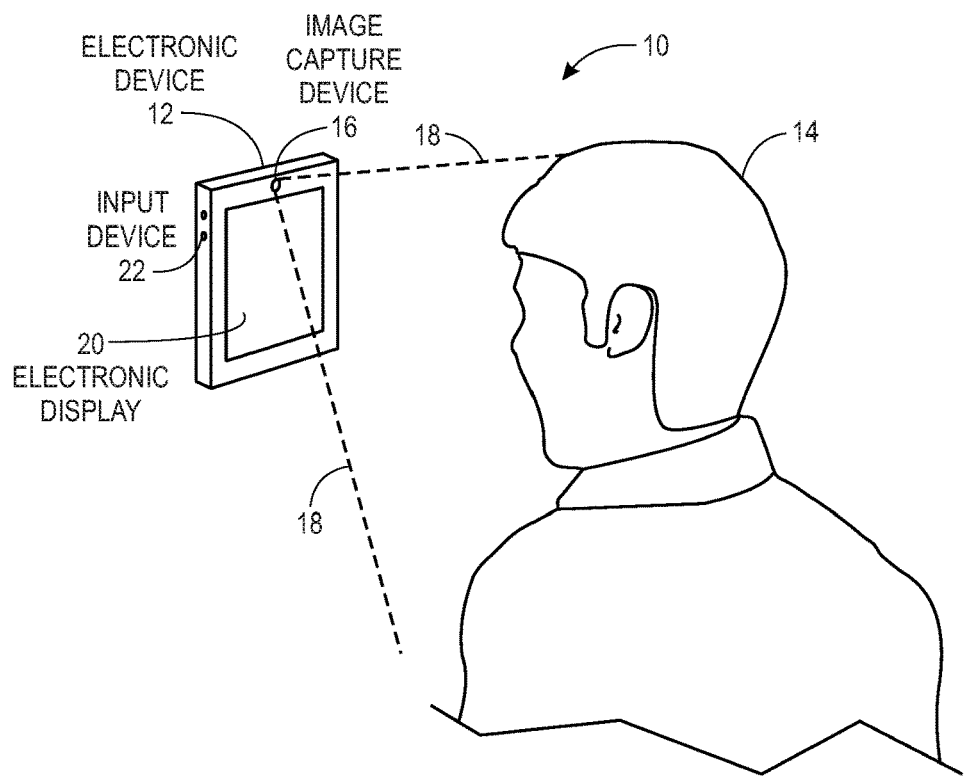
FIG. 2 is the user authentication system of FIG. 1 using another example electronic device, in accordance with an embodiment of the present disclosure.

FIG. 2 is the user authentication system 10 of FIG. 1 using another example electronic device 12, in accordance with an embodiment of the present disclosure. The electronic device 12 may be a mobile electronic device (e.g., a smartphone, a wearable device, a laptop, and the like) or a personal electronic device (e.g., a personal computer) of the user 14. As with the electronic device 12 of FIG. 1, the electronic device 12 of FIG. 2 may include the image capture device 16 that has any suitable viewing angle or range 18, such that a face, portion of a body, or entire body of the user may be captured. The electronic device 12 may include the electronic display 20 that outputs information to the user 14. In some embodiments, the electronic display 20 may include touch functionality. The electronic device 12 may also include the one or more input devices 22.

Figure 3:
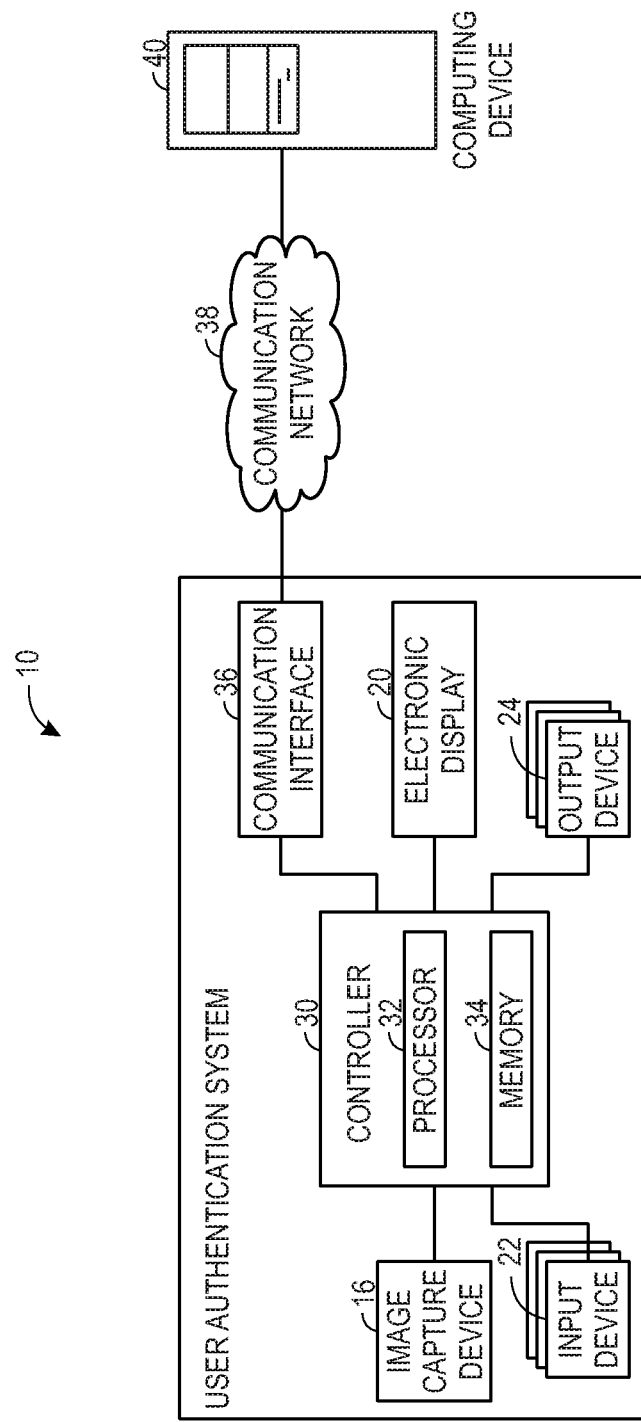
FIG. 3 is a block diagram of the user authentication system of FIG. 1, in accordance with an embodiment of the present disclosure.

FIG. 3 is a block diagram of the user authentication system 10 of FIG. 1, in accordance with an embodiment of the present disclosure. The user authentication system 10 includes a controller 30 that includes one or more processors 32 and one or more memory devices 34. The one or more processors 32 (e.g., microprocessors) may execute software programs and/or instructions to authenticate a user 14. Moreover, the one or more processors 32 may include multiple microprocessors, one or more "general-purpose" microprocessors, one or more special-purpose microprocessors, and/or one or more application specific integrated circuits (ASICs), or some combination thereof. For example, the one or more processors 32 may include one or more reduced instruction set (RISC) processors. The one or more memory devices 34 may store information such as control software, look up tables, configuration data, etc. In some embodiments, the one or more memory devices 34 may store credentials set by the user 14 to compare to for authentication. In some embodiments, the one or more processors 32 and/or the one or more memory devices 34 may be external to the controller 30. The one or more memory devices 34 may include a tangible, non-transitory, machine-readable-medium, such as a volatile memory (e.g., a random access memory (RAM)) and/or a nonvolatile memory (e.g., a read-only memory (ROM)). The one or more memory devices 34 may store a variety of information and may be used for various purposes. For example, the one or more memory devices 34 may store machine-readable and/or processor-executable instructions (e.g., firmware or software) for the one or more processors 32 to execute, such as instructions to authenticate a user 14. The one or more memory devices 34 may include one or more storage devices (e.g., nonvolatile storage devices) that may include read-only memory (ROM), flash memory, a hard drive, or any other suitable optical, magnetic, or solid-state storage medium, or a combination thereof.

As illustrated, the image capture device 16 is communicatively coupled to the controller 30. As such, images (or videos) captured by the image capture device 16 may be sent to the controller 30 for storage (e.g., in the one or more memory devices 34), analysis (e.g., by the one or more processors 32), forwarding (e.g., via one or more communication interfaces 36), or any other suitable purpose. It should be noted that the image capture device 16 may include multiple image capture devices (e.g., cameras) for capturing different perspectives of the user 14. This may facilitate further confirmation and analysis of facial aspects and expressions, for example.

Similarly, the one or more input devices 22 are communicatively coupled to the controller 30. Information provided by the user 14 via the one or more input devices 22 may be sent to the controller 30 (e.g., to enter authentication information, account information, changes to account information, and the like). In some embodiments, the electronic display 20 may be an input device (e.g., a touchscreen) and send information provided by the user 14 to the controller 30.

The one or more output devices 24 are also communicatively coupled to the controller 30. The controller 30 may output information, goods, or other physical objects to the user 14. The electronic display 20 may be also be used as an output device to provide information to the user 14.

The user authentication system 10 also includes one or more communication interfaces 36. The one or more communication interfaces 36 may enable the controller 30 to communicate with any suitable communication network 38. For example, as discussed above, a communication interface 36 may enable the controller 30 to forward images captured by the image capture device 16 to a computing device 40. The one or more communication interfaces 36 may also enable the user authentication system 10 to communicate with additional communication networks 38. For example, a communication interface 36 may enable the controller 30 to communicate with wireless networks (e.g., mobile, WiFi, LAN, WAN, Internet, and the like). In this manner, the one or more communication interfaces 36 may enable the controller 30 to communicate with computing devices 40 to authenticate the user 14, to analyze authentication information, to retrieve authentication information so that the controller 30 may authenticate the user 14, to change information (e.g., account information) as requested by the user 14, and the like.

Figure 4:
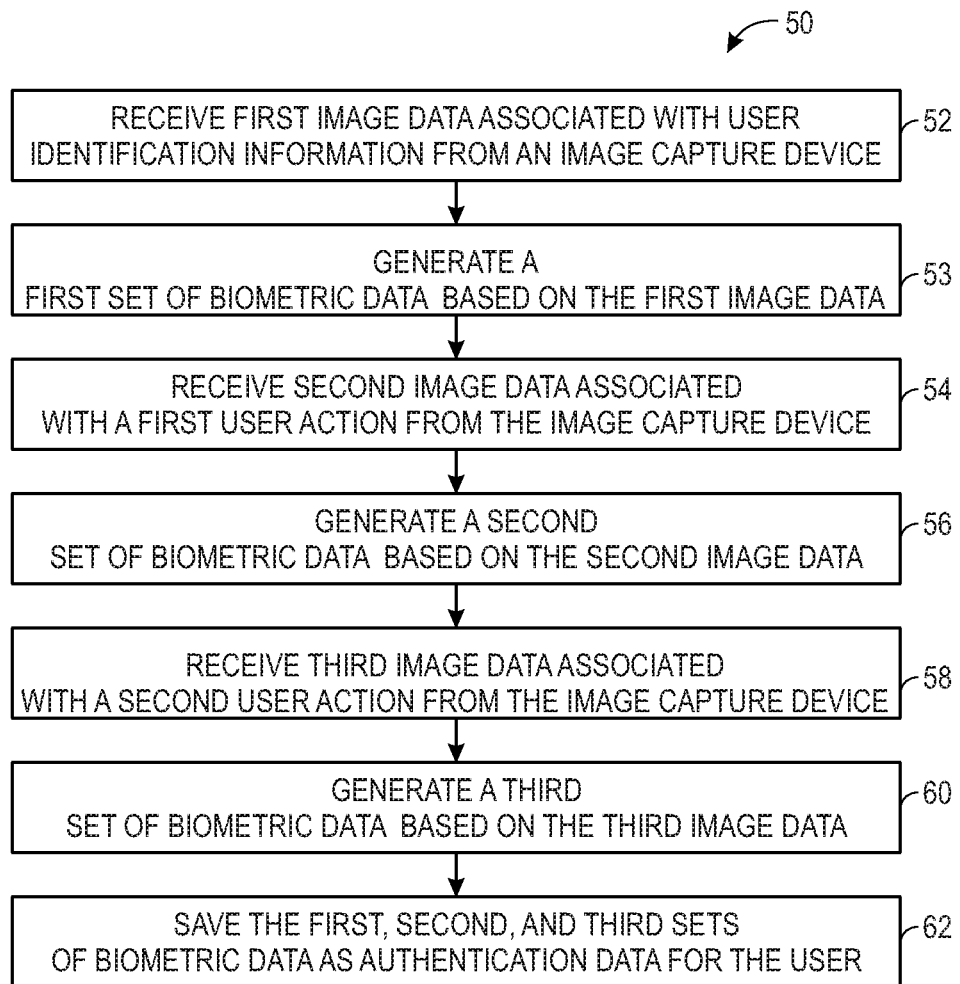
FIG. 4 is a flowchart illustrating a method for setting authentication information for a user, in accordance with an embodiment of the present disclosure.

FIG. 4 is a flowchart illustrating a method 50 for setting authentication information for a user 14, in accordance with an embodiment of the present disclosure. The method 50 may be performed by any suitable device that may control components of the user authentication system 10, such as the controller 30. While the method 50 is described using steps in a specific sequence, it should be understood that the present disclosure contemplates that the described steps may be performed in different sequences than the sequence illustrated, and certain described steps may be skipped or not performed altogether. In some embodiments, the method 50 may be implemented by executing instructions stored in a tangible, non-transitory, computer-readable medium, such as the one or more memory devices 34, using a processor, such as the one or more processors 32 of the controller 30.

The controller 30 may prompt the user 14 for user identification information. For example, when the user 14 initially creates or sets up an account (e.g., a financial account, an insurance account, a social media account, an electronic device profile, and the like), the user 14 may enter the user identification information. The user identification information may include image data (e.g., of the face) of the user, and the controller 30 may use the image capture device 16 to capture the image data. As a result, the controller 30 receives (process block 52) first image data associated with the user identification information from the image capture device 16. The user identification information may also or alternatively include a username, a login, a password, a personal identification number, security questions and corresponding answers, an address, an email address, a phone number, a facial image or series of facial images, and the like. As such, the user identification information may also or alternatively be entered by the user 14 via the input device 22 (e.g., a keyboard, mousing device, a camera, and the like) and/or the electronic display 20 (e.g., a touch screen). In some embodiments, the user identification information may include biometric data, such as retinal or fingerprint information, which may be provided via the input device 22. The controller 30 may use the user identification information to create or link a user profile identifying the user 14 to other information, such as biometric data, account data, historical data, and so forth.

The controller 30 generates (process block 53) a first set of biometric data based on the first image data. The controller 30 may identify biometric points of the user 14 in the first image data to generate the first set of biometric data. The biometric points may include facial muscles, eyes, shoulders, elbows, hands, fingers, sternum, hips, knees, and/or center of mass, of the user 14. In alternative or additional embodiments, the first set of biometric data may be any suitable data that may identify the user or provide evidence of that the user is a live person, such as movement data, temperature data, and the like.

The controller 30 may prompt the user 14 to perform a first user action. The first user action may be captured by the image capture device 16. As a result, the controller 30 receives (process block 54) second image data (e.g., one or more images or a video) associated with the first user action from the image capture device 16. The first user action may be any suitable action that may be visually distinguishable, such as an expression (e.g., happiness, sadness, anger, disgust, and the like), a gesture (e.g., pointing, winking, looking in a direction, holding a hand up, tilting of the head, sticking the tongue out, and the like), a movement (e.g., waving, blinking, clapping, nodding, shaking of the head, and the like). In some embodiments, the controller 30 may provide a list of possible actions that the user 14 may perform via the electronic display 20 or the output device 24.

The controller 30 generates (process block 56) a second set of biometric data based on the second image data. The controller 30 may identify biometric points of the user 14 in the second image data to generate the second set of biometric data. In some embodiments, the controller 30 may identify facial muscle activation points based on an expression or gesture performed by the user 14. The controller 30 may also or alternatively identify biomechanical points of the body of the user 14 to identify gestures or movements performed by the user 14. In alternative or additional embodiments, the second set of biometric data may be any suitable data that may identify the user or provide evidence of that the user is a live person, such as movement data, temperature data, and the like.

In some embodiments, the controller 30 may use the communication interface 36 to send the second image data to the computing device 40 over the communication network 38. The computing device 40 may generate the second set of biometric data from the second image data. It should be noted that in some embodiments, only biometric data may be used to identify the user 14 (e.g., such that no username is used).

The controller 30 may prompt the user 14 to perform a second user action. The second user action may be captured by the image capture device 16. As a result, the controller 30 receives (process block 58) third image data (e.g., one or more images or a video) associated with the second user action from the image capture device 16. The controller 30 may or may not expressly prompt the user 14 to perform the second action such that it is different from the first action. The user 14 may be instructed to provide the second action for user as a confirmation code.

The controller 30 generates (process block 60) a third set of biometric data based on the third image data. The controller 30 may identify biometric points of the user 14 in the third image data to generate the third set of biometric data. The third set of biometric data may be based on similar or different biometric points used to generate the second set of biometric data. In some embodiments, the controller 30 may use the communication interface 36 to send the third image data to the computing device 40 over the communication network 38. The computing device 40 may generate the third set of biometric data from the third image data. In alternative or additional embodiments, the third set of biometric data may be any suitable data that may identify the user or provide evidence of that the user is a live person, such as movement data, temperature data, and the like.

In some embodiments, the controller 30 (or the computing device 40) may determine whether the third set of biometric data is the same as the second set of biometric data. If so, the controller 30 may prompt the user 14 to perform the second action, such that the second action is different from the first action. The controller 30 may not save the third image data associated with the second action until the user 14 performs a second action that is different from the first action.

Other authentication information may be provided in addition to the sets of biometric data, and may include biometric data or any other suitable data that may identify the user or provide evidence of that the user is a live person, such as movement data, temperature data, and the like. For example, a password or personal identification number may be entered using the one or more input devices 22 or the electronic display 20. Thermal imaging may be used (e.g., via the image capture device 16, where the image capture device 16 has thermal imaging capabilities) to facilitate determining whether thermal characteristics of the user 14 approximately match that of a living user. Fingerprint or retinal matching as provided by the one or more input devices 22 may also be used to further authenticate the user 14. In some embodiments, such authentication information may be combined with the sets of biometric data. For example, the user 14 may perform the first action and/or the second action while entering a keystroke on a keyboard, having a fingerprint read, drawing a pattern on a trackpad, speaking a code phrase, and the like.

In some embodiments, the controller 30 may replay the first image data, the second image data, and/or the third image data on the electronic display 20 and request that the user 14 confirm whether the image data is/are acceptable. In this way, the user 14 may review the image data, and decide whether other actions are preferable. If the user 14 does not confirm the actions, the controller 30 may return to process block 52 or process block 58 such that the user 14 may again perform the first or second user action.

While only three sets of biometric data are discussed, it should be understood that any suitable number (e.g., 4-10) of sets of biometric data may be used for authentication. As such, there may be a threshold number (e.g., 2-9) of corresponding user actions that the user 14 is prompted to perform before saving the sets of biometric data. In some embodiments, after the threshold number is reached, the controller 30 may request that the user 14 confirm whether the user 14 is done setting the authentication actions. The user 14 may indicate completion or non-completion by touching the electronic display 20, using the one or more input devices 22, and/or performing a prompted action (e.g., nodding, shaking the head, and the like).

The controller 30 then saves (process block 62) the sets of biometric data as authentication data for the user 14. The authenticated sets of biometric data may be used to identify and authenticate the user 14 when the user 14 subsequently attempts to access the account. The controller 30 may save the second and third sets of biometric data as a sequence, such that an order in which the user 14 performed the corresponding actions is preserved.

The controller 30 may save the sets of biometric data in the one or more memory devices 34. The controller 30 may associate or link the sets of biometric data to an account or profile of the user 14. The controller 30 may also or alternatively use the communication interface 36 to send the sets of biometric data to the computing device 40 so that the computing device 40 saves the sets of biometric data.

Figure 5:
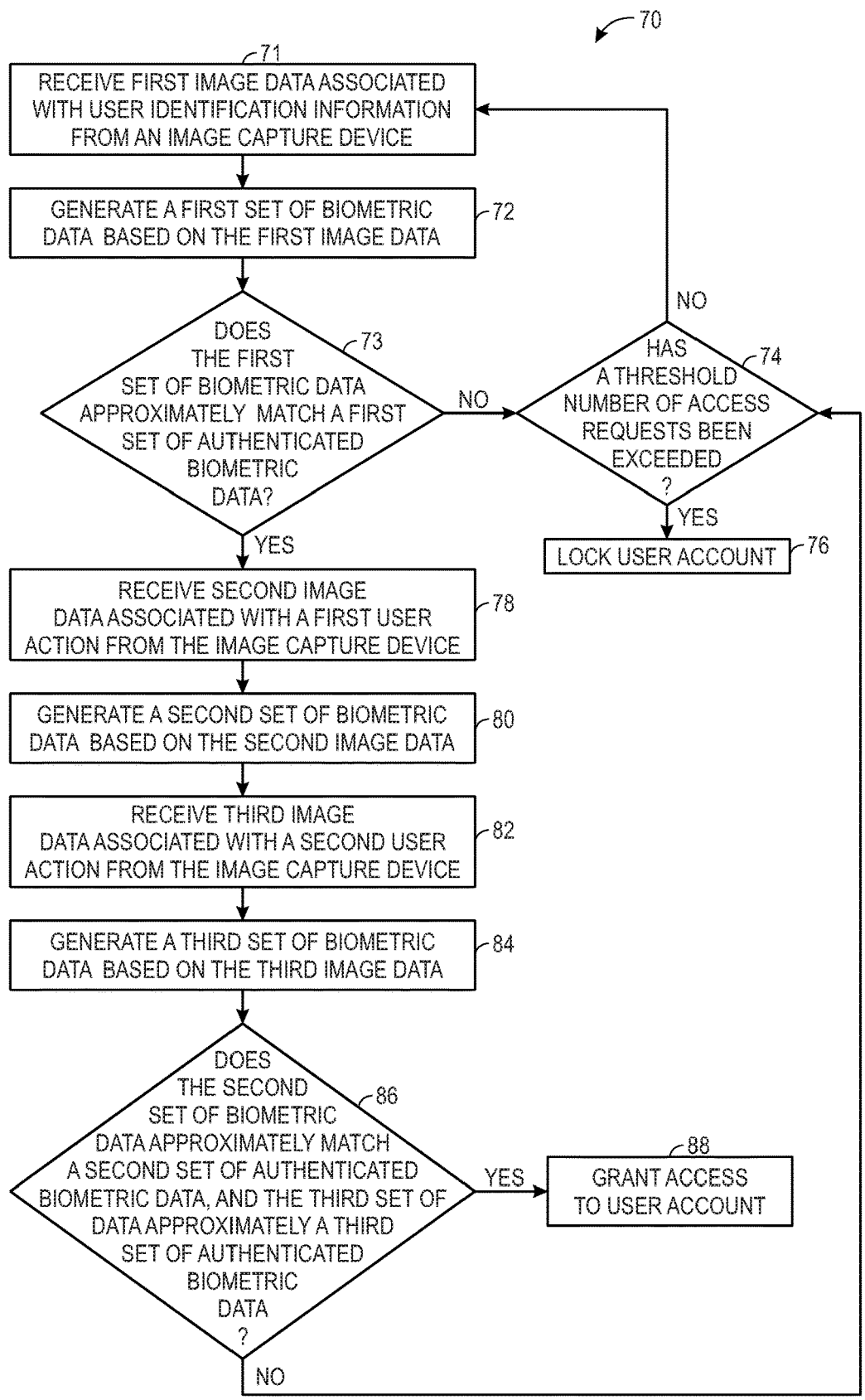
FIG. 5 is a flowchart illustrating a method for authenticating a user, in accordance with an embodiment of the present disclosure.

FIG. 5 is a flowchart illustrating a method 70 for authenticating a user 14, in accordance with an embodiment of the present disclosure. The method 70 may be performed by any suitable device that may control components of the user authentication system 10, such as the controller 30. While the method 70 is described using steps in a specific sequence, it should be understood that the present disclosure contemplates that the described steps may be performed in different sequences than the sequence illustrated, and certain described steps may be skipped or not performed altogether. In some embodiments, the method 70 may be implemented by executing instructions stored in a tangible, non-transitory, computer-readable medium, such as the one or more memory devices 34, using a processor, such as the one or more processors 32 of the controller 30.

The controller 30 may prompt the user 14 for user identification information. The user identification information may include image data (e.g., of the face) of the user, and the controller 30 may use the image capture device 16 to capture the image data. As a result, the controller 30 receives (process block 71) first image data associated with user identification information from the image capture device 16. The user identification information may also or alternatively include a username, a login, a password, a personal identification number, security questions and corresponding answers, an address, an email address, a phone number, a facial image or series of facial images, and the like. In some embodiments, the user identification information may include biometric data, such as retinal or fingerprint information, which may be provided via the input device 22.

The controller 30 generates (process block 72) a first set of biometric data based on the first image data. The controller 30 may identify biometric points of the user 14 in the first image data to generate the first set of biometric data. The biometric points may include facial muscles, eyes, shoulders, elbows, hands, fingers, sternum, hips, knees, and/or center of mass, of the user 14. In alternative or additional embodiments, the first set of biometric data may be any suitable data that may identify the user or provide evidence of that the user is a live person, such as movement data, temperature data, and the like.

The controller 30 may determine (decision block 73) whether the first set of biometric data approximately matches the first set of authenticated biometric data. The first set of authenticated biometric data may be associated with user identification information. For example, the first set of authenticated biometric data may correspond to first image data associated with the user identification information as received by the controller 30 in process block 52 of method 50. In alternative or additional embodiments, the first set of authenticated biometric data may be any suitable data that may identify the user or provide evidence of that the user is a live person, such as movement data, temperature data, and the like. In some embodiments, the controller 30 may determine that the first set of biometric data approximately matches the first set of authenticated biometric data when a threshold percentage (e.g., 50-98%) or number of matching biometric points (e.g., 5-500) is exceeded. For example, if 80% of the biometric points associated with the first set of biometric data matches the biometric points associated with the first set of authenticated biometric data, the controller 30 may determine that the first set of biometric data approximately matches the first set of authenticated biometric data.

If the controller 30 determines (decision block 73) that the first set of biometric data does not approximately match a first set of authenticated biometric data, then the controller 30 determines (decision block 74) whether a threshold number of access requests has been exceeded. This determination may add security to the authentication process by preventing multiple access request violations (e.g., from attempts to access the account without authentication). The threshold number of access requests may be any suitable number (e.g., 2-10) to enable the user 14 to authenticate himself or herself, but prevent attempts to access the account without authentication.

If the controller 30 determines (decision block 74) that a threshold number of authentications has been exceeded, the controller 30 locks (block 76) the user account. The controller 30 may then inform the user 14 (e.g., via the electronic display 20) that the account has been locked. The controller 30 may provide contact information and/or instructions to the user 14 to unlock the account.

If the controller 30 determines (decision block 74) that a threshold number of authentications has not been exceeded, the controller 30 returns to process block 71 to receive the user identification information.

If the controller 30 determines (decision block 73) that the first set of biometric data approximately matches the first set of authenticated biometric data, the controller 30 may prompt the user 14 to perform a first user action. In one embodiment, this includes merely requesting authentication and the user 14 performing a visually detectable action or facial change as the authentication. The first user action may be captured by the image capture device 16. For security reasons, the controller 30 may prompt the user 14 to perform the first user action without providing any indication of what the first user action is, as only the user 14 should know the first user action. As a result, the controller 30 receives (process block 78) second image data (e.g., one or more images or a video) associated with the first user action from the image capture device 16.

The controller 30 generates (process block 80) a second set of biometric data based on the second image data. In some embodiments, the controller 30 may use the communication interface 36 to send the second image data to the computing device 40 over the communication network 38. The computing device 40 may generate the second set of biometric data from the second image data. The controller 30 may identify biometric points of the second image data to generate the second set of biometric data. In alternative or additional embodiments, the second set of biometric data may be any suitable data that may identify the user or provide evidence of that the user is a live person, such as movement data, temperature data, and the like.

The controller 30 may prompt the user 14 to perform a second user action. In one embodiment, this includes merely requesting authentication and the user 14 performing a visually detectable action or facial change as the authentication. The second user action may be captured by the image capture device 16. For security reasons, the controller 30 may prompt the user 14 to perform the second user action without providing any indication of what the second user action is, as only the user 14 should know the second user action. As a result, the controller 30 receives (process block 82) third image data (e.g., one or more images or a video) associated with the second user action from the image capture device 16.

The controller 30 generates (process block 84) a third set of biometric data based on the third image data. In some embodiments, the controller 30 may use the communication interface 36 to send the third image data to the computing device 40 over the communication network 38. The computing device 40 may generate the third set of biometric data from the third image data. In alternative or additional embodiments, the third set of biometric data may be any suitable data that may identify the user or provide evidence of that the user is a live person, such as movement data, temperature data, and the like.

In some embodiments, the controller 30 may request that the user 14 confirm whether the user 14 has completed each or all of the authentication actions via the electronic display 20. The user 14 may indicate completion or non-completion by touching the electronic display 20, using the one or more input devices 22, and/or performing a prompted action (e.g., nodding, shaking the head, and the like).

The controller 30 may receive second and third sets of authenticated biometric data for the user 14. The second and third sets of authenticated biometric data may be acquired as a result of saving previous sets of biometric data as described in process block 62 of method 50. The controller 30 may receive the second and third sets of authenticated biometric data from the one or more memory devices 34 or the computing device 40 via the communication network 38 using the communication interface 36. For example, the controller 30 may use the user identification information acquired from process block 72 to identify the associated second and third sets of authenticated biometric data for the user 14.

The controller 30 may determine (decision block 86) whether the second set of biometric data approximately matches the second set of authenticated biometric data and the third set of biometric data approximately matches the third set of authenticated biometric data. In some embodiments, the controller 30 may determine that a set of biometric data approximately matches a set of authenticated biometric data when a threshold percentage (e.g., 50-98%) or number of matching biometric points (e.g., 5-500) associated with the sets of biometric data is exceeded. If additional sets of biometric data are used for authentication, then the controller 30 may also determine whether the subsequent sets of biometric data approximately match the subsequent sets of authenticated biometric data. In alternative or additional embodiments, the second, third, and/or additional sets of biometric data may be any suitable data that may identify the user or provide evidence of that the user is a live person, such as movement data, temperature data, and the like.

In some embodiments, the controller 30 may determine whether the sets of biometric data are in the same sequence or order as the sets of authenticated biometric data. That is, the controller 30 determines whether the actions performed by the user 14 associated with the sets of biometric data are in the same sequence or order as the actions associated with the sets of authenticated biometric data.

If the controller 30 determines (decision block 86) that the second set of biometric data approximately matches the second set of authenticated biometric data and the third set of biometric data approximately matches the third set of authenticated biometric data, then the user 14 is authenticated, and the controller 30 grants (process block 88) access to the user account.

If the controller 30 determines (decision block 86) that the second set of biometric data does not approximately match the second set of authenticated biometric data or the third set of biometric data does not approximately match the third set of authenticated biometric data, then the controller 30 determines (decision block 74) whether a threshold number of authentications has been exceeded.

If the controller 30 determines (decision block 86) that the threshold number of authentications has not been exceeded, the controller 30 returns to process block 71 to receive the first image data associated with the user identification information. In some embodiments, the controller 30 may return to other steps of the method 70, such as to process block 78 to receive the second image data associated with the first user action. If the controller 30 determines (decision block 74) that the threshold number of authentications has been exceeded, the controller 30 locks (block 76) the user account.

While only three sets of biometric data are discussed, it should be understood that any suitable number (e.g., 4-10) of sets of biometric data may be used for authentication. As such, the controller 30 may prompt the user 14 to perform subsequent actions (e.g., provide further authentication) and generate subsequent sets of biometric data based on subsequent acquisitions.

Advantageously, the electronic device 12 may perform the methods 50 and 70 without adding new hardware. That is, because the authentication process uses multiple actions performed by the user 14 that are captured by the image capture device 16, the electronic device 12 may not use additional hardware, such as a retinal scanner, a fingerprint reader, a card reader, and the like. As such, standalone machines that perform the methods 50 and 70 (e.g., the electronic device 12 of FIG. 1) may be manufactured quicker and for less cost. Moreover, the methods 50 and 70 may be performed by mobile electronic devices, wearable electronic devices, personal electronic devices, and the like, such as the electronic device 12 of FIG. 2. As such, the number of standalone machines may be reduced, as users may carry such electronic devices on their person, which may be even more cost efficient.

Present embodiments provide a simplified and secure process and system for accessing protected data and resources. For example, the user 14 may provide a user identification by merely providing an image of himself or herself via the image capture device 16 when prompted to provide identification when logging into an account. Further, the user 14 can provide authentication via a gesture in response to prompting for authentication. For example, instead of providing a personal identification number to confirm identity, the user 14 may wink or make a facial expression for capture by the image capture device 16, the user 14 knowing that the image corresponds to the authentication. Other facial expressions or gestures (e.g., facial changes alone or in addition to hand gestures) may be employed for this purpose in accordance with present embodiments. Indeed, authentication data may account for facial and other body movements. For example, authentication may include winking and snapping fingers. By using such data, users do not need to memorize usernames and passwords and acquisition of such information by criminals becomes more difficult.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A user authentication system comprising:
an image capture device configured to capture image data of a user;
an electronic display configured to display information to the user;
a controller communicatively coupled to the image capture device and the electronic display and comprising one or more processors configured to:
receive first image data associated with user identification information from the image capture device;
generate a first set of biometric data based on the first image data;
receive second image data associated with a first user body movement from the image capture device in response to correlation of the first set of biometric data to a first set of authenticated biometric data, wherein the first set of authenticated biometric data is associated with a first identity image of the user stored in a memory, and wherein the second image data comprises a plurality of biomechanical points associated with a position of a digit, an appendage, a head, or any combination thereof, of the user;
identify one or more biomechanical points of the plurality of biomechanical points in the second image data;
generate a second set of biometric data based on the one or more identified biomechanical points;
receive third image data associated with a second user body movement from the image capture device;
generate a third set of biometric data based on the third image data;
request the user to perform the second user body movement again in response to determining that the second set of biometric data correlates to the third set of biometric data; and
grant access to a user account in response to correlation of the second set of biometric data to a second set of authenticated biometric data and correlation of the third set of biometric data to a third set of authenticated biometric data, wherein the second set of authenticated biometric data is associated with a second identity image of the user stored in the memory, and wherein the third set of authenticated biometric data is associated with a third identity image of the user stored in the memory.

2. The user authentication system of claim 1, wherein the one or more processors are configured to:
receive fourth image data associated with a third user body movement from the image capture device;
generate a fourth set of biometric data based on the fourth image data; and
grant access to the user account in response to the second set of biometric data correlating to the second set of authenticated biometric data, the third set of biometric data correlating to the third set of authenticated biometric data, and the fourth set of biometric data correlating to a fourth set of authenticated biometric data.

3. The user authentication system of claim 1, wherein the one or more processors are configured to determine whether a threshold number of access requests has been exceeded.

4. The user authentication system of claim 3, wherein the one or more processors are configured to lock the user account in response to the threshold number of access requests being exceeded.

5. The user authentication system of claim 1, wherein the second set of authenticated biometric data includes a portion of the third set of authenticated biometric data.

6. The user authentication system of claim 1, wherein the one or more processors are configured to request that the user confirm whether the second image data or the third image data are acceptable.

7. The user authentication system of claim 6, wherein the one or more processors are configured to request that the user perform the first user body movement or the second user body movement in response to the user indicating that the second image data or the third image data is unacceptable.

8. The user authentication system of claim 1, wherein the one or more processors are configured to grant access to the user account in response to a sequence of the second set of biometric data and the third set of biometric data matching a sequence of the first set of authenticated biometric data and the second set of authenticated biometric data.

9. The user authentication system of claim 1, wherein the one or more processors are configured to grant access to the user account in response to determining that the one or more identified biomechanical points of the second set of biometric data correlate to one or more biomechanical points associated with the second set of authenticated biometric data.

10. The user authentication system of claim 9, wherein determining that the one or more identified biomechanical points of the second set of biometric data correlate to the one or more biomechanical points comprises determining that a number of the one or more identified biomechanical points correlating to the one or more biomechanical points of the second set of biometric data exceeds a threshold.

11. The user authentication system of claim 10, wherein the threshold comprises at least five types of biomechanical points.

12. A method comprising:
receiving, with a processor, first image data associated with user identification information from an image capture device;
generating, with the processor, a first set of biometric data based on the first image data;
receiving, with the processor, second image data associated with a first user body movement, a first facial expression, or both, from the image capture device in response to the first set of biometric data correlating to a first set of authenticated biometric data, wherein the first set of authenticated biometric data is associated with a first identity image of a user stored in a memory, and wherein the second image data comprises:

a plurality of biomechanical points associated with a position of a digit, an appendage, a head, or any combination thereof;
a facial expression; or
both;
identifying one or more biomechanical points of the plurality of biomechanical points, the facial expression, or both;
generating, with the processor, a second set of biometric data based on the one or more identified biomechanical points, the identified facial expression, or both;
receiving, with the processor, third image data associated with a second user body movement, a second facial expression, or both, from the image capture device;
requesting, with the processor, that the user confirm whether the second image data or the third image data is acceptable;
requesting, with the processor, that the user perform the first user body movement, the first facial expression, or both, or the second user body movement, the second facial expression, or both, in response to the user indicating that the second image data or the third image data is unacceptable;
generating, with the processor, a third set of biometric data based on the third image data; and
granting, with the processor, access to a user account in response to the second set of biometric data correlating to a second set of authenticated biometric data and the third set of biometric data correlating to a third set of authenticated biometric data, wherein the second set of authenticated biometric data is associated with a second identity image of the user stored in the memory, and wherein the third set of authenticated biometric data is associated with a third identity image of the user stored in the memory.

13. The method of claim 12, comprising determining, with the processor, whether a threshold number of access requests has been exceeded.

14. The method of claim 12, comprising requesting, with the processor, the user to perform the second user body movement, the second facial expression, or both, again in response to determining that the second set of biometric data correlates to the third set of biometric data.

15. The method of claim 12, comprising granting, with the processor, access to the user account in response to a first sequence of the second set of biometric data and the third set of biometric data correlating to a second sequence of the second set of authenticated biometric data and the third set of authenticated biometric data.

16. One or more tangible, non-transitory, machine-readable media comprising instructions configured to cause a processor to:
receive first image data associated with user identification information from an image capture device;
generate a first set of biometric data based on the first image data;
receive second image data associated with a first user body movement from the image capture device in response to the first set of biometric data correlating to a first set of authenticated biometric data, wherein the first set of authenticated biometric data is associated with a first identity image of a user stored in a memory, and wherein the second image data comprises:
a plurality of biomechanical points associated with a position of a digit, an appendage, a head, or any combination thereof;
a facial expression; or
both;
identify one or more biomechanical points of the plurality of the biomechanical points;
generate a second set of biometric data based on the one or more identified biomechanical points;
receive third image data associated with a second user body movement from the image capture device;
generate a third set of biometric data based on the third image data; and
grant access to a user account in response to:
the second set of biometric data correlating to a second set of authenticated biometric data, wherein the second set of authenticated biometric data is associated with a second identity image of the user stored in the memory;
the third set of biometric data correlating to a third set of authenticated biometric data, wherein the third set of authenticated biometric data is associated with a third identity image of the user stored in the memory; and
a first sequence of the second set of biometric data and the third set of biometric data correlating to a second sequence of the second set of authenticated biometric data and the third set of authenticated biometric data.

* * * * *